J. B. POSPESHIL.
AUXILIARY FRAME AND SPRING ATTACHMENT.
APPLICATION FILED MAR. 24, 1919.
1,352,625.
Patented Sept. 14, 1920.
3 SHEETS—SHEET 1.
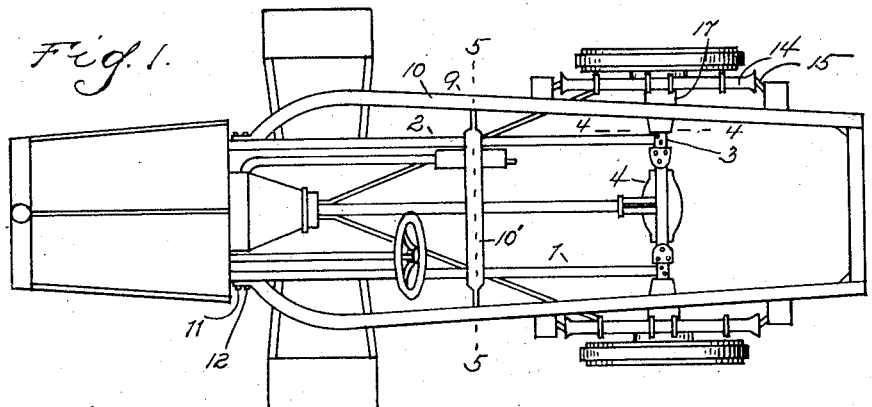
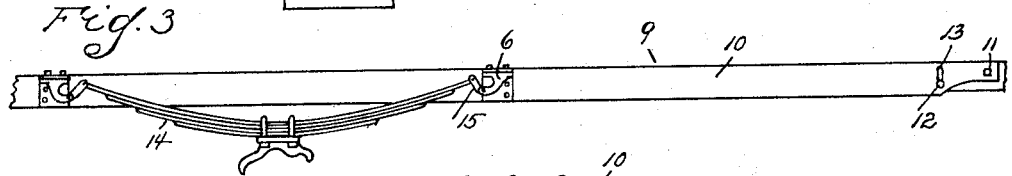
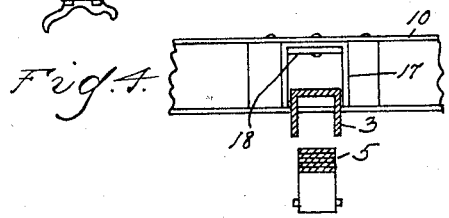
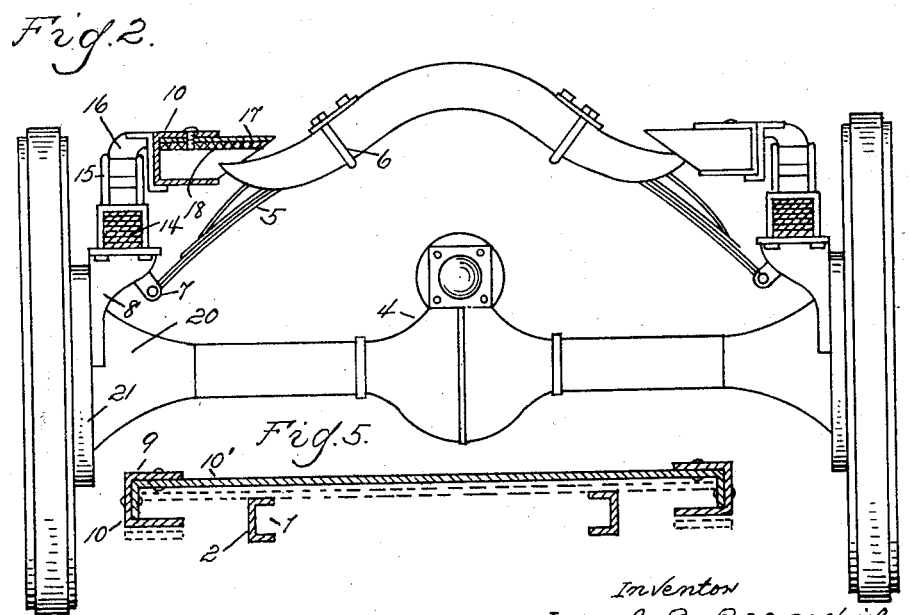
Inventor
Joseph B. Pospeshil
By Whittemore Hulbert & Whittemore
Attorneys J. B. POSPESHIL.
AUXILIARY FRAME AND SPRING ATTACHMENT.
APPLICATION FILED MAR. 24, 1919.
1,352,625.
Patented Sept. 14, 1920.
3 SHEETS—SHEET 2.
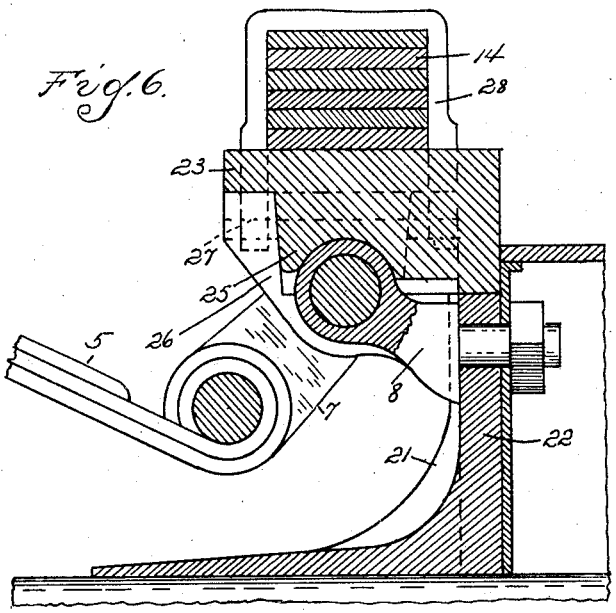
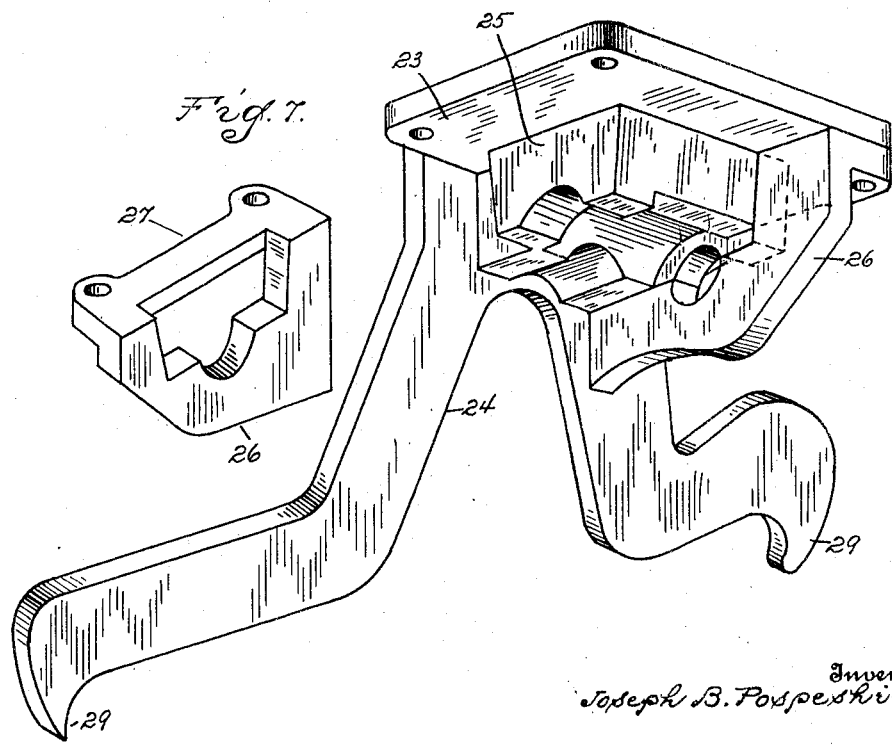
Inventor
Joseph B. Pospeshil
By Whittemore Hulbert & Whittemore
Attorneys

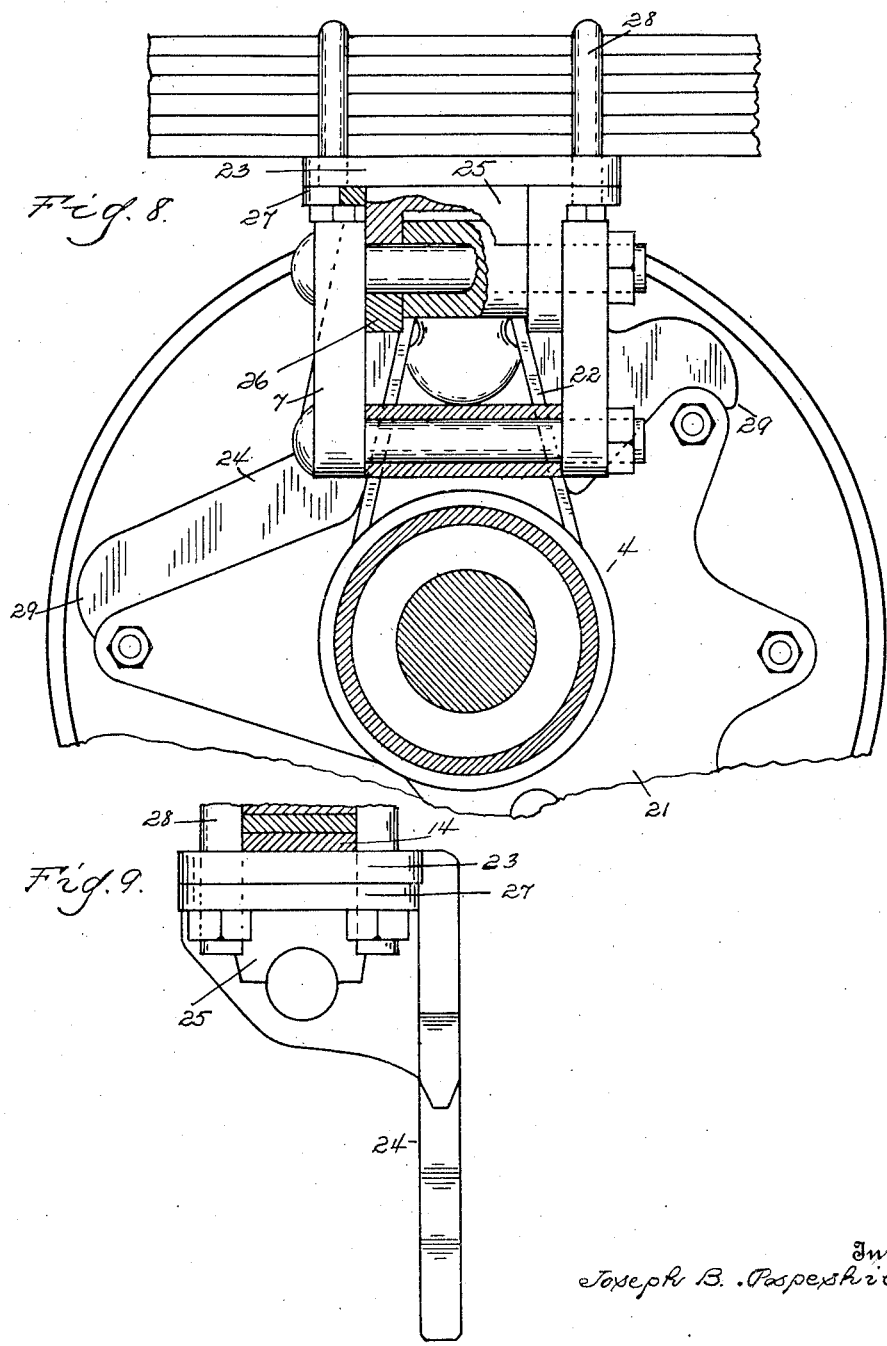

UNITED STATES PATENT OFFICE.

JOSEPH B. POSPESHIL, OF DETROIT, MICHIGAN.

AUXILIARY FRAME AND SPRING ATTACHMENT.

1,352,625.  Specification of Letters Patent.  Patented Sept. 14, 1920.

Application filed March 24, 1919. Serial No. 284,597.

*To all whom it may concern:*

Be it known that I, JOSEPH B. POSPESHIL, a citizen of the United States of America, residing at Detroit, in the county of Wayne and State of Michigan, have invented certain new and useful Improvements in Auxiliary Frames and Spring Attachments, of which the following is a specification, reference being had therein to the accompanying drawings.

The invention relates to auxiliary frame and spring attachments and has for one of its objects the provision of a construction having an auxiliary frame adapted to be secured to the frame of a motor vehicle and mounted to be movable independently thereof. Another object is to provide a construction in which the auxiliary frame and the springs secured to this frame form a unit attachment which can be readily applied to a motor vehicle. A further object is to provide a construction in which the auxiliary frame is connected to the frame of the motor vehicle and is yieldably mounted upon the axle housing of the motor vehicle independent of the transverse spring mounted upon the axle housing and carrying the vehicle frame. A still further object is to provide means upon the auxiliary frame for actuating the vehicle spring upon abnormal movement of the auxiliary frame in one direction. Other objects of the invention reside in the novel arrangements and combinations of parts as more fully hereinafter set forth.

In the drawings:

Figure 1 is a top plan view of the motor vehicle embodying my invention;

Fig. 2 is an enlarged rear elevation thereof partly in section;

Fig. 3 is an enlarged side elevation of the auxiliary frame and spring attachment;

Fig. 4 is an enlarged cross-section on the line 4—4 of Fig. 1;

Fig. 5 is an enlarged cross-section on the line 5—5 of Fig. 1;

Fig. 6 is a section in the plane of the axle and the transverse spring mounted thereon, showing the auxiliary spring support;

Fig. 7 is a perspective view of the auxiliary spring support;

Fig. 8 is a sectional elevation at right angles to Fig. 6;

Fig. 9 is an elevation of Fig. 6.

My improvement is applicable to that type of motor vehicles in which the main spring suspension for the body is formed by a transversely extending spring arranged substantially in the plane of the axle and supported by shackles from the brackets at the axle ends. 1 is the frame of the motor vehicle comprising the side sills 2 and the rear cross bar 3, which is in the plane of the axle housing 4 and supported thereon by the transversely extending spring 5 secured to the cross bar by the clips 6 and supported by the shackles 7 from the brackets 8 at the ends of the axle housing.

9 is an auxiliary frame preferably of greater width than the vehicle frame and also extending rearwardly beyond the rear cross bar of the vehicle frame. The auxiliary frame has the side sills 10, which are bent laterally inward at their forward ends to lie adjacent to the side sills 2 of the vehicle frame, to which they are pivotally secured by means of the bolts 11. Bolts 12 in rear of the bolts 11 engage elongated apertures 13 in the side sills 10, whereby the rear end of the auxiliary frame 9 is free to rock about the pivots 11.

Auxiliary springs 14 are provided extending longitudinally of the auxiliary frame 9 and secured to the side sills 10 by shackles 15, pivoted upon suitable brackets 16 secured to the side sills. These auxiliary springs are mounted upon the rear axle housing 4, the arrangement being such that normally the auxiliary springs carry the load, thereby relieving the transversely extending spring. For the purpose of transferring a portion of an abnormal load upon the auxiliary frame 9 to the vehicle frame 1, suitable brackets or gussets 17 are provided secured to the side sills 10 in the plane of the rear cross bar 3. These brackets or gussets extend inwardly to overlap the ends of the rear cross bar and in their normal positions are spaced thereabove. Upon abnormal downwardly movement of the auxiliary frame, the brackets or gussets will engage the ends of the rear cross bar and thereby transmit some of the load into the transverse spring 5. For the purpose of deadening the noise between the brackets or gussets 17 and the ends of the rear cross bar 3, suitable inserts 18, such as rubber bumper strips, are secured in the gussets or brackets to contact with the ends of the rear cross bar.

In order to relieve the bolts 11 securing the forward end of the auxiliary frame 9 to the vehicle frame 1 when the auxiliary frame has an abnormal load, the cross bar 10' is provided extending between the side sills 10 of the auxiliary frame, the arrangement being such that for ordinary loads the cross bar does not rest upon the side sills 2 of the vehicle frame but when heavier loads are carried the auxiliary springs 14 yield sufficiently to permit the cross bar to rest upon the side sills, as shown by the dotted lines in Fig. 5.

For the purpose of providing means of supporting the side springs 14 without the necessity of changing the axle construction or the boring of holes for securing bolts, the attachment is designed for use on a specific construction of axle, viz., one in which the axle housing 4 is provided with flanged ends 20 for attachment to the brake-head 21. The flange 20 is also provided with the upwardly-extending portion 22 having the inwardly-extending bracket 8 for engaging with the shackles 7. The attachment comprises a shelf member 23 which has a downwardly extending flange 24 bifurcated and fashioned to conform to the contour of the flange 20 and upward extension 22 thereof, and resting upon the ledge thereby, said flange with its outer face adjacent to the brake-head 21. To hold the shelf in this position it has formed on the under side thereof a concave bearing 25 for fitting over the shackle bracket 8. 26 are straps for complementary bearing members engaging the under side of the end portions of the shackle bracket and provided with laterally-extending flanges 27, which are clamped to the under side of the member 23. The securing bolts for the flanges 27 are formed at the ends of U-shaped clip members 28 which perform the further function of embracing the side spring 14 supported upon the shelf.

It will be noted that the shelf is secured in position solely by the clamping of the strap members 26 and the engagement of the bifurcated arms 24 with the ledge on the flange 20, these serving to hold the shelf from turning. There are no clamping bolts for directly securing the shelf to the brake-head, but the fact that the bifurcated flange 24 rests on the ledge will relieve the shackle bracket from a portion of the load, this being carried directly into the flange 20. The ends of the furcations of the member 24 are preferably hooked as indicated at 29 so as to hold the device from endwise movement, which relieves the bracket 8 of stresses incident to the inertia of stopping or starting.

It will be readily seen that the auxiliary frame and auxiliary spring form a unit construction which may be quickly applied to the standard make of motor vehicle and when in place will furnish side springs for supporting the auxiliary frame under normal conditions. When under abnormal conditions, the transversely extending rear spring is brought into use. This will greatly increase the load-carrying capacity of the truck and the stresses transmitted through the auxiliary spring are carried directly into the brake-head and to the supporting wheel without increasing the stresses upon the axle housing.

What I claim as my invention is:

1. In a motor vehicle, the combination with a frame, an axle housing, and ground wheels at the end of said axle housing, of an auxiliary frame mounted upon said first-mentioned frame and axle housing independently of the ground wheels and movable independently of said first-mentioned frame.

2. In a motor vehicle, the combination with a frame and an axle housing, of a unit attachment comprising a frame mounted upon said first-mentioned frame and movable independently thereof, and springs secured to said last-mentioned frame and mounted upon said axle housing.

3. In a motor vehicle, the combination with a frame and an axle housing, of a unit attachment comprising an auxiliary frame pivoted to said first mentioned frame, and auxiliary side springs secured to said auxiliary frame and mounted upon said axle housing.

4. In a motor vehicle, the combination with a frame and an axle housing, of an auxiliary frame pivotally secured at its forward end to said first-mentioned frame, auxiliary side springs secured to said auxiliary frame, and supports for said auxiliary springs secured to said axle housing.

5. In a motor vehicle, the combination with a frame and an axle housing, said axle housing having a flanged end forming a brake-head, of an auxiliary frame pivotally secured at its forward end to said first-mentioned frame, auxiliary side springs secured to said last-mentioned frame, and auxiliary spring supports secured to said brake-head and each having a bearing on the ledge formed by the edge of said flange.

6. In a motor vehicle, the combination with a frame, an axle housing and a transverse spring mounted upon said housing, of a member pivotally connected to said frame and yieldably mounted upon said housing independent of said transverse spring, and means upon said member for actuating said transverse spring upon abnormal movement of said member in one direction.

7. In a motor vehicle, the combination with a frame, an axle housing and a transverse spring on said housing, of a member pivotally mounted upon said frame, springs secured to said member and mounted upon said axle housing, and means mounted upon said member for actuating said transverse spring, said means being normally independent of said spring.

8. In a motor vehicle, the combination with a frame, an axle housing and a transverse spring between said housing and frame, of a unit attachment comprising an auxiliary frame secured to said first mentioned frame, springs permanently secured to said auxiliary frame and mounted upon said axle housing, and means upon said auxiliary frame normally independent of said transverse spring, adapted to actuate said spring.

9. In a motor vehicle, the combination with a frame, an axle housing and a transverse spring upon said housing, of an auxiliary frame pivotally secured at its forward end to said first-mentioned frame, auxiliary side springs secured to said auxiliary frame and mounted upon said axle housing, and a bracket upon said auxiliary frame and normally independent of said transverse spring, adapted to actuate the same.

10. In a motor vehicle, the combination with a frame and an axle housing, of an auxiliary frame pivotally secured to said first-mentioned frame and yieldably mounted upon said housing, and means upon said auxiliary frame for taking an abnormal load off the pivot connecting said frame.

11. In a motor vehicle, the combination with a frame and an axle housing, of an auxiliary frame, bolts for pivotally securing the forward end of said auxiliary frame to said first-mentioned frame, springs for normally supporting said auxiliary frame upon said housing, and a cross bar upon said auxiliary frame and adapted to engage said first-mentioned frame when the former is under abnormal load.

In testimony whereof I affix my signature.

JOSEPH B. POSPESHIL.